(12) United States Patent
Rongstock (10) Patent No.: US 8,220,508 B2
(45) Date of Patent: Jul. 17, 2012

(54) FUEL FILLING DEVICE

(75) Inventor: Dieter Rongstock, Mörfelden-Walldorf (DE)

(73) Assignee: GM Global Technology Operations LLC, Detroit, MI (US)

( * ) Notice: Subject to any disclaimer, the term of this patent is extended or adjusted under 35 U.S.C. 154(b) by 565 days.

(21) Appl. No.: 12/393,971

(22) Filed: Feb. 26, 2009

(65) Prior Publication Data

US 2009/0218009 A1     Sep. 3, 2009

(30) Foreign Application Priority Data

Feb. 28, 2008    (DE) .................... 10 2008 011 733

(51) Int. Cl.
*B65B 1/04*    (2006.01)

(52) U.S. Cl. ........ 141/372; 141/350; 141/285; 220/86.2

(58) Field of Classification Search .................. 141/285, 141/290, 297, 339, 340, 372, 375, 391, 392, 141/350; 220/86.2, 86.3
See application file for complete search history.

(56) References Cited

U.S. PATENT DOCUMENTS

| | | | | |
|---|---|---|---|---|
| 4,630,748 A | * | 12/1986 | Keller | 220/86.3 |
| 5,033,517 A | * | 7/1991 | Bucci | 141/59 |
| 5,839,489 A | | 11/1998 | Ganachaud et al. | |
| 5,860,460 A | * | 1/1999 | Hidano et al. | 141/286 |
| 6,546,972 B1 | * | 4/2003 | Foltz | 141/349 |
| 6,705,481 B2 | * | 3/2004 | Temmesfeld | 220/86.2 |
| 7,997,306 B2 | * | 8/2011 | Kobayashi et al. | 141/346 |
| 7,997,307 B2 | * | 8/2011 | Benjey | 141/350 |

FOREIGN PATENT DOCUMENTS

| | | |
|---|---|---|
| DE | 29719910 U1 | 1/1998 |
| DE | 19812384 A1 | 9/1999 |
| DE | 19912645 C1 | 10/2000 |
| DE | 69608764 T2 | 2/2001 |
| DE | 19948312 A1 | 4/2001 |

OTHER PUBLICATIONS

German Patent Office, German Search Report for Application No. 102008011733.1, dated Nov. 18, 2008.

* cited by examiner

*Primary Examiner* — Timothy L Maust
*Assistant Examiner* — Timothy Kelly
(74) *Attorney, Agent, or Firm* — Ingrassia Fisher & Lorenz, P.C.

(57) ABSTRACT

A fuel filling device that includes, but is not limited to a filling head and a filling pipe disposed between fuel tank and filling head, has a further guiding tube having a front end viewed in the direction of insertion and a rear end viewed in the direction of insertion, which is disposed inside the filling pipe, and the front end is disposed directly below the filling head.

30 Claims, 6 Drawing Sheets

FUEL FILLING DEVICE

CROSS-REFERENCE TO RELATED APPLICATION

This application claims priority to German Patent Application No. 102008011733.1, filed Feb. 28, 2008, which is incorporated herein by reference in its entirety.

TECHNICAL FIELD

The invention relates to a fuel filling device, which may be used, for example, in a motor vehicle.

BACKGROUND

When filling a fuel tank such as, for example, a fuel tank of a motor vehicle with liquid fuel, foaming and/or swirling of the fuel may occur and in the case of refueling, spit-back may occur.

In order to prevent backflow of fuel from the filling pipe of the fuel tank, a filling protection valve can be inserted in the filling pipe of the fuel tank. The valve may be disposed in the end section of the filling pipe (i.e., directly adjacent to the tank). Alternatively, a valve can be installed as an integrated part of the filling head. Such a valve is known, for example, from DE 199 12 645 A1. However, these known arrangements have the disadvantages that the valves are complex and consequently the manufacturing costs are high.

It is therefore at least one object of the present invention to provide a fuel filling device, which reduces filling problems, and in particular spit-back of the fuel in a simplified manner, and allows filling at high filling speeds. In addition, other objects, desirable features, and characteristics will become apparent from the subsequent summary and detailed description, and the appended claims, taken in conjunction with the accompanying drawings and this background.

SUMMARY

A fuel filling device comprises a filling head and a filling pipe disposed between fuel tank and filling head. According to an embodiment of the invention, there is disposed inside the filling pipe is a further guiding tube having a front end viewed in the direction of insertion and a rear end viewed in the direction of insertion. The front end is disposed directly below the filling head.

The additional guiding tube disposed inside the filling pipe guides the fuel more uniformly inside the filling pipe. Preferably, on transition from the external fuel source, for example, a fuel nozzle, to the filling pipe, the flow is guided almost laminarly. The swirling and foaming of the fuel during filling can at least be reduced. At the same time, the spit-back of fuel during refueling is reduced.

The additional guiding tube can be incorporated inside a conventional filling pipe and is not an integral part of the filling head or the tank. Consequently, a fuel filling device can be retrofitted with the guiding tube in a simple manner. This is advantageous since the construction of the filling pipe and the filling device need not be modified to allow improved filling.

The guiding tube and the filling device can be used in applications such as motor vehicles, for example, automobiles, trucks. However, it is also possible to use the filling device in stationary motors.

It is known that different automobile models are based on a common global base model to reduce development and manufacturing costs. Consequently, the filling device must not only be suitable for different automobile models but also for different countries.

However, the fuel pressure and the filling speed during refueling are not the same in all countries so that the problems of abound and swirling during refueling occur more frequently in some countries than in others. Consequently, it is possible to retrofit the additional guiding tube in fuel filling device in automobiles which are sold in countries where refueling problems occur more frequently. Additional manufacturing costs are reduced since no different filling devices need to be produced for the same base model.

In one exemplary embodiment, the marginal edge of the front end of the guiding tube is expanded in such a manner that the guiding tube is held inside the filling pipe by means of the underside of the filling head. This underside can be the underside of a lower restriction of the filling head. This arrangement has the advantage that the guiding tube is held inside the filling pipe without any additional modification of the filling pipe.

In a further exemplary embodiment, the marginal edge of the front end of the guiding tube is expanded in such a manner that during filling of the vehicle fuel tank, the front end of the guiding tube can accommodate the fuel nozzle tip. The inside diameter of the front end of the guiding tube is greater than the outside diameter of the filling nozzle tip so that it can accommodate the filling nozzle tip. This arrangement has the advantage that the fuel flow can be guided directly from the fueling nozzle tip by means of the guiding tube.

The outside diameter of the filling nozzle tip can be determined by the condition of the filling device or by the type of fuel. The filling nozzle tips for trucks are typically larger than those for automobiles. Also in some countries the diameter of the filling nozzle tip for diesel is different from that for gasoline to prevent incorrect filling of a tank with the wrong fuel and consequently damage to the motor.

In one exemplary embodiment, the guiding tube is disposed between a lower conical region of the filling pipe and an underside of the filling head of the filling pipe. This can be specified by a corresponding length of the guiding tube, which is dependent on the construction of the filling device, in particular the construction of the expanded region above the conical region of the filling pipe. In further exemplary embodiments, the dimensions of the guiding tube are selected in such a manner that the rear end of the guiding tube impacts on a lower conical region of the filling pipe and the front end of the filling pipe lies below the filling head.

The arrangement of the guiding tube inside the filling pipe is determined more accurately by the length of the guiding tube. Furthermore, the dimensions of the guiding tube can be selected in such a manner that a gap is provided between the front end of the guiding tube and the underside of the filling head, when the rear end impacts against the lower conical region. This gap can be annular. The mobility of the guiding tube inside the filling pipe can be determined more accurately in this manner and the effect of the guiding tube optimized.

The guiding tube can have additional length tolerance compensation. In one exemplary embodiment, the front end of the guiding tube has a spring element, which serves as a length tolerance compensation for the guiding tube. Due to the spring element, differences in the length of the guiding tube, which have arisen, for example, due to manufacturing tolerances, can be compensated.

The filling head can have a restriction end. In this case, the spring element may be adaptable to the outer side of the restriction end of the filling head to compensate for differences in the length of the guiding tube. In one exemplary embodiment, the spring element is provided as a flexible expandable marginal edge. In a further exemplary embodiment, the spring element has a plurality of individual strips which are each flexible and expandable and project from the marginal edge of the front end of the guiding tube. In both exemplary embodiments, the spring element can be adapted to the outer side of the restriction end. Length differences are compensated by a different coverage of the outer side of the restriction end by the spring element. With increasing length of the guiding tube, the coverage of the outer side of the spring element increases accordingly.

When a spring element is provided, the guiding tube can have a length at which the rear end of the guiding tube impacts against the lower conical region of the filling pipe and the spring element extends over the outer side of the restriction end of the filling head. The guiding tube can be substantially straight or curved. If the guiding tube is curved, the guiding tube can have a U-shaped or V-shaped configuration. A curved guiding tube has the advantage that it shows particularly good performance at high filling speeds so that refueling at these high filling speeds is possible with intermediate switching and without spit-back.

The opening angle of the U-shaped or V-shaped bend can be between about 130° and 180° (i.e., $130° \leq \Theta < 180°$). The arrangement of the tip of the bend can lie at different points on the length of the guiding tube. In one exemplary embodiment, the tip of the bend lies at a point which is located between about 50% and about 30% of the total length of the guiding tube from the rear end of the guiding tube. The arrangement of the bend and the shape and opening angle of the bend are selected in such a manner that the fuel is guided as uniformly as possible.

The guiding tube preferably comprises a plurality of through-openings, which extend through the wall thickness of the guiding tube. The through-openings provide a type of labyrinth which serves to separate gaseous from liquid fuel. The fuel is guided through the through-openings in order to ensure a pressure reduction and/or flow deflection when switching off the filling nozzle or when connecting subsequently. The number and the position of the through-openings can be specified according to the design framework of the filling pipe and/or the average filling nozzle position in order to achieve more optimal flow deflection at the filling pistol end.

The through-openings can be arranged perpendicular to the longitudinal axis of the guiding tube. Alternatively, they can be disposed at an angle of greater than about 0° to about 90° to the longitudinal axis. The through-openings can be directed in the direction of insertion or opposite to the direction of insertion. In a further embodiment, the direction of the through-openings is varied along the guiding tube in order to improve the flow deflection.

Depending on the desired filling nozzle position, not only the marginal edge of the guiding tube but also the guiding tube can have an inside diameter which is dimensioned in such a manner that the guiding tube can accommodate a fuel nozzle tip. In one exemplary embodiment, the inside diameter of the guiding tube is substantially the same over the length of the guiding tube.

In a further exemplary embodiment, the inside diameter of the guiding tube in a central region of the guiding tube is smaller than at the front end and smaller than at the rear end. In a further development of this exemplary embodiment, the narrowing of the inside diameter can be disposed in the area of the tip of the bend of the guiding tube.

In one exemplary embodiment, the inside diameter of the guiding tube is approximately 2 mm larger than the outside diameter of the filling nozzle tip. The inside diameter of the guiding tube can be about 32 mm for a truck filling nozzle or about 27 mm for a diesel filling nozzle or about 23 mm for a gasoline filling nozzle. These two diameters are suitable for use with filling nozzle tips of about 30 mm or about 25 mm which are the diameters of the conventional European filling nozzle for trucks or automobiles.

The guiding tube can be loose inside the filling pipe. This has the advantage that a filling device can be used with the guiding tube without adapting the filling pipe. Furthermore, assembly is easy. Also, when turning the filling nozzle, no increased pressure will be produced which may lead to intermediate switch-offs since the guiding tube can turn with the filling nozzle.

Alternatively, the guiding tube can be fastened in the inner surface of the filling pipe. This has the advantage that the position and consequently the effect can be stipulated so that any undesirable knocking and/or differences in efficiency can be avoided.

The embodiments of the invention also specify the use of a guiding tube according one of the exemplary embodiments described above in a fuel filling device of a motor vehicle and a filling pipe disposed between fuel tank and filling head. The guiding tube is located inside the filling pipe and the front end of the guiding tube is located directly below the filling head to prevent backflow or spit-back of the fuel during filing of the fuel tank.

According to an embodiment of the invention, a guiding tube for preventing backflow of fuel during filling of a fuel filling device is also provided, comprising a filling head and a filling pipe with fuel disposed between the fuel tank and the filling head. The guiding tube comprises a front end viewed in the direction of insertion and a rear end viewed in the direction of insertion and is dimensioned in such a manner that when in use, the guiding tube is adapted as a separate part inside the filling pipe, wherein the front end is located directly below the filling head. Furthermore, the guiding tube is dimensioned in such a manner that when in use, a marginal edge of the front end of the guiding tube is expanded in such a manner that the guiding tube is held inside the filling pipe by means of an underside of the filling head. The guiding tube has an inside diameter which is dimensioned in such a manner that the guiding tube can accommodate a fuel nozzle tip.

The guiding tube can have the configuration according to one of the exemplary embodiments of the guiding tube described above. The front end of the guiding tube can have a spring element according to one of the exemplary embodiments described above, which serves as a length tolerance compensation for the guiding tube. Likewise, the guiding tube can be straight or have a curved shape.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
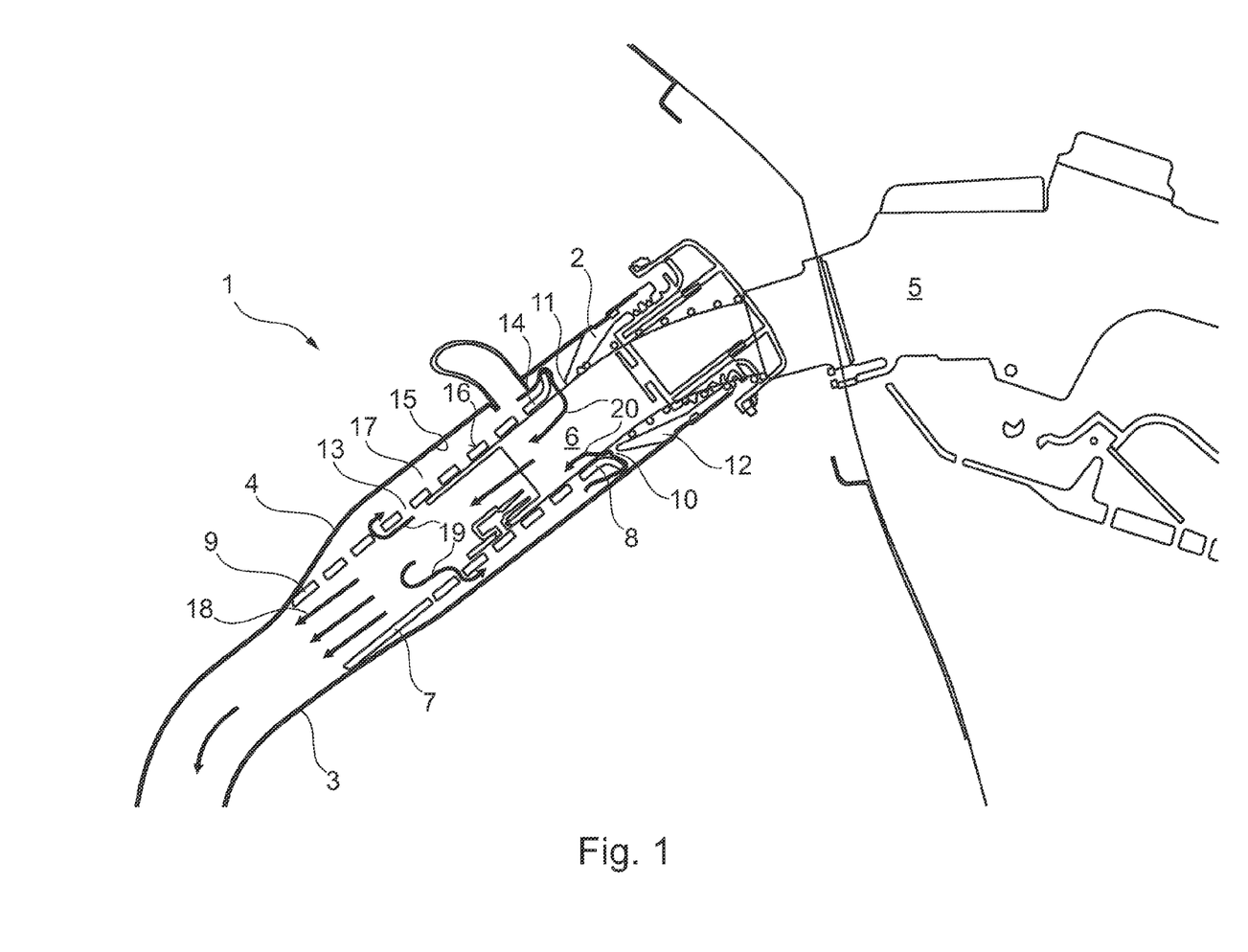
FIG. 1 shows a fuel filling device according to a first exemplary embodiment.

FIG. 1 shows a schematic diagram of a fuel filling device 1 of a motor vehicle. The fuel filling device 1 comprises a filling head 2 and a filling pipe 3 disposed between a fuel tank not shown and the filling head 2. Only the upper inlet region of the filling pipe 3 is shown in FIG. 1.

A filling nozzle 5 is also shown in FIG. 1, its tip 6 being disposed inside the filling pipe 3 so that the fuel tank can be filled with liquid fuel such as diesel or gasoline.

The filling pipe 3 has a lower conical region 4, which is formed from a reduction in the diameter of the filling pipe 3. The filling pipe 3 is expanded above this conical region 4 so that the filling nozzle tip 6 can be inserted inside the filling pipe 3.

According to an embodiment of the invention, a further guiding tube 7 is disposed inside the filling pipe 3. The guiding tube 7 is substantially tubular and has a front end 8 when viewed in the direction of insertion and a rear end 9 when viewed in the direction of insertion. In this first exemplary embodiment, the length of the guiding tube 7 is substantially straight.

The front end 8 of the guiding tube 7 is located directly below the filling head 2 and is spaced apart from the lower surface 11 of the restriction end 12 of the filling head 2 by means of an annular gap 10. The rear end 9 of the guiding tube 7 impacts against the conical region 4. The guiding tube 7 further has a plurality of through-openings 13, which extend between the wall thicknesses of the guiding tube 7.

The guiding tube 7 is substantially cylindrical. The marginal edge 14 of the front end 8 is expanded so that the underside 11 of the filling head 2 is adaptable at least partly inside the inner region of the marginal edge 14. Consequently, the guiding tube 7 is held by means of the lower side 11 of the filling head 2 in the filling pipe 3.

The length of the guiding tube 7 is selected so that it fits between the conical region 4 and the underside 11 of the filling head 2. The inside diameter of the guiding tube 7 is selected in such a manner that the guiding tube 7 can accommodate the filling nozzle tip 6. In one embodiment, the inside diameter of the guiding tube 7 is approximately 2 mm greater than the outside diameter of the filling nozzle tip 6. The outside diameter of the guiding tube 7 is selected so that the guiding tube 7 fits inside the filling pipe 3 so that a gap 17 is formed between the inside 15 of the filling pipe 3 and the outer side 16 of the guiding tube 7.

The arrangement of the rear end 9 of the guiding tube 7 on the conical region 4 of the upper expanded region of the filling pipe 3 guides the fuel uniformly during filling and preferably approximately laminarly into this region. This laminar flow is shown by the arrows 18 in FIG. 1.

The guiding tube 7 is a separate part so that no wedging effect of the filling nozzle 5 in the filling pipe can occur due to turning the filling nozzle 5. The uniform flow transition from the filling nozzle tip 6 to the guiding tube 7 is thus retained during turning.

During filling, the filling nozzle tip 6 lies in the guiding tube 7, as shown in FIG. 1. Due to the laminar guidance of the volume flow, only a little foaming and swirling of the fuel occurs. This effect is also achieved at high filling speeds so that filling also takes place at high filling speeds without intermediate switch-offs.

The through-openings 13 provide a reduction in pressure or flow deflection when switching off the filling nozzle or clicking subsequently. Shortly before switching off the filling nozzle, the liquid level in the guiding tube increases more rapidly than in the space between the outer side of the guiding tube and the expanded upper region of the filling pipe 3. When switching off the filling nozzle, a pressure reduction occurs due to the through-openings 13. The flow rate is reduced and spit-back of fuel is avoided.

The combination of the guiding tube 7 and its arrangement inside the filling pipe 3 provides a type of labyrinth, whereby the liquid fuel is separated from air or fuel vapor and is guided back into the filling pipe 3. This is shown by the arrows 19 and 20 in FIG. 1.

The fuel is guided through the through-openings 13 in the side walls of the guiding tube 7 into the annular space 17, through the annular gap 10 between the upper end 8 of the guiding tube 7 and the underside 11 of the filling head 2. Thereafter, the vapor can be guided outward through the annular gap 10 between the filling nozzle 5 and the restriction end 12 of the lower filling head 2. Liquid fuel is guided back into the guiding tube 7 and the filling pipe 3.

Figure 2:
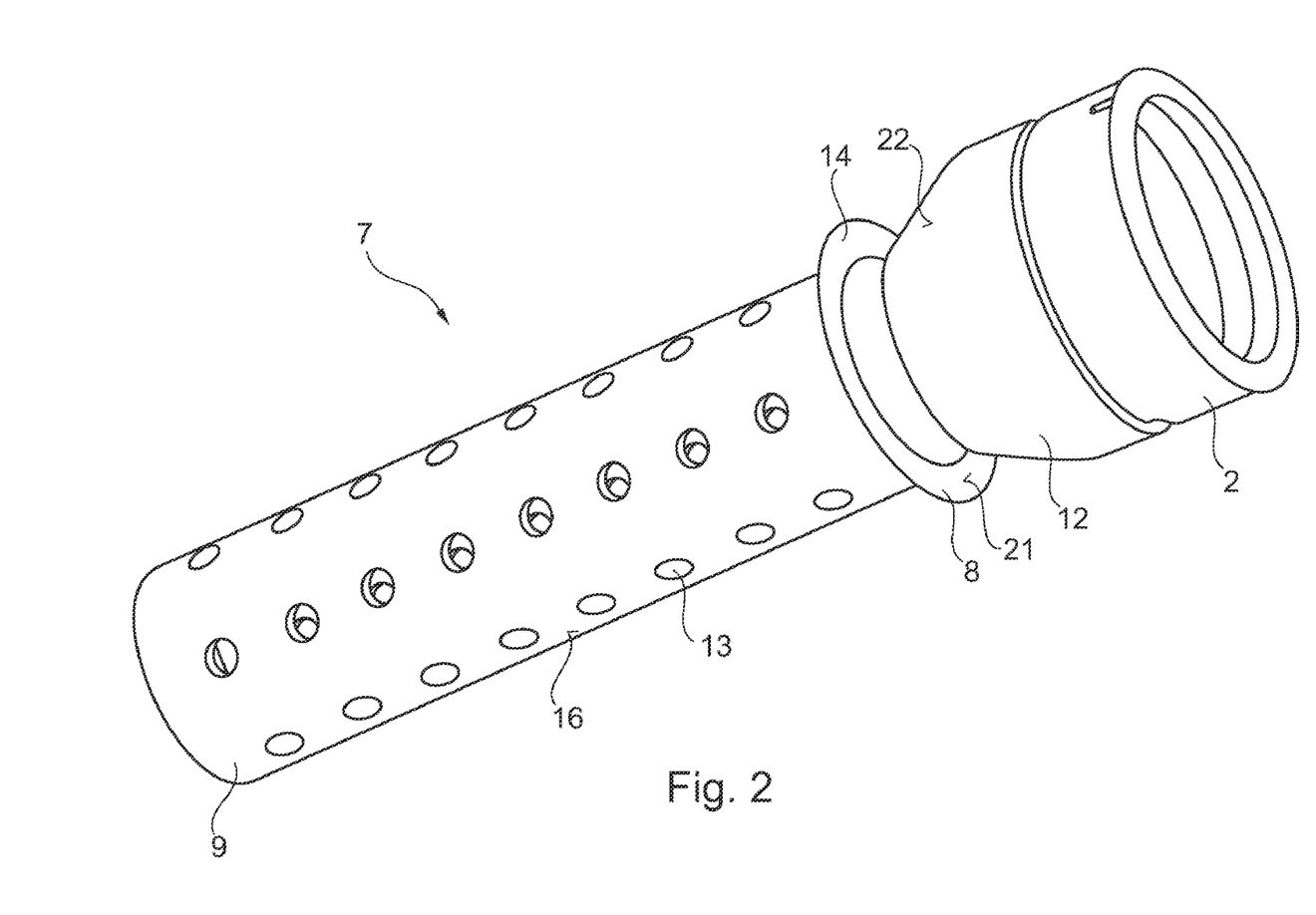
FIG. 2 shows a three-dimensional view of the guiding tube from FIG. 1.

FIG. 2 shows a three-dimensional view of the guiding tube 7 in FIG. 1 as well as the filling head 2 with its restriction end 12 of the filling device 1. In the first exemplary embodiment, the guiding tube 7 is substantially cylindrical. The front end 8 is expanded so that the inner side wall 21 of the expanded front end is matched to the outer side 22 of the restriction end 12 of the filling head 2. The through openings 13 are arranged in a plurality of rows which extend in the longitudinal direction of the guiding tube 7, the rows being distributed over the surface of the guiding tube 7.

Figure 3:
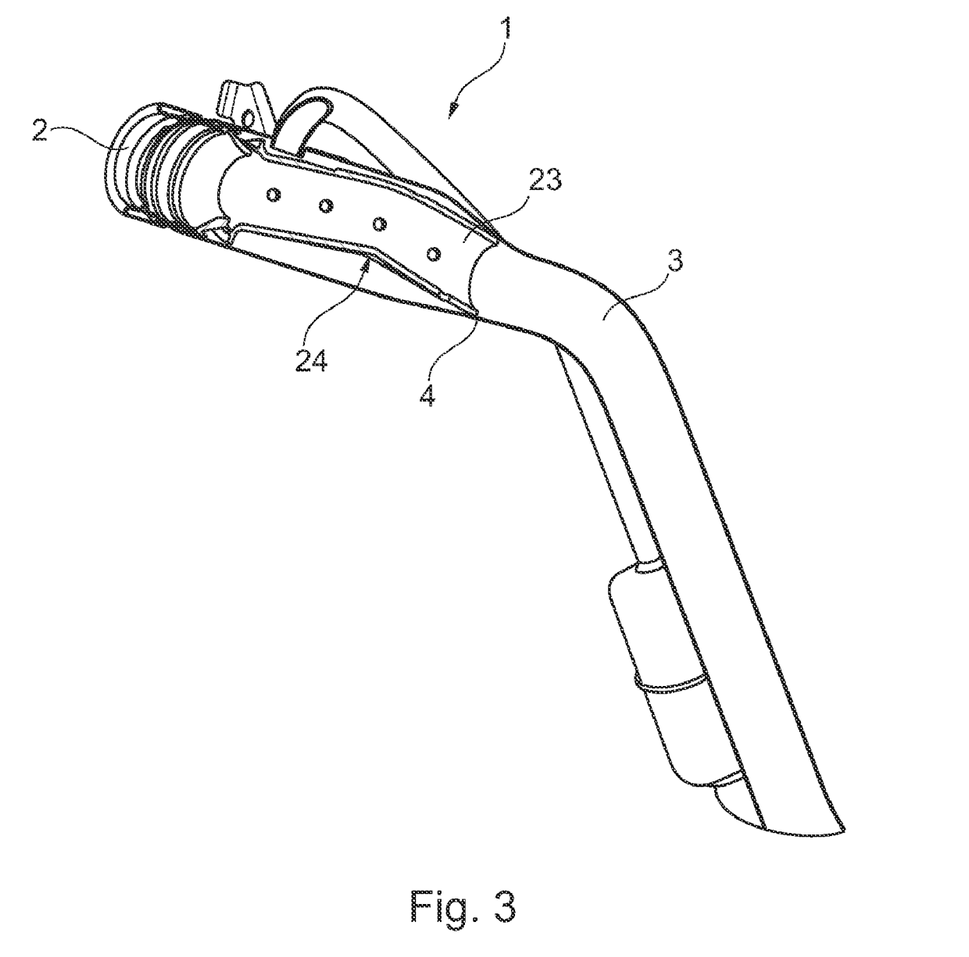
FIG. 3 shows a partial cross section of a filling device having a guiding tube according to a second exemplary embodiment.

FIG. 3 shows a fuel filling device 1 of a motor vehicle with a guiding tube 23 according to a second exemplary embodiment. As in the first exemplary embodiment, the guiding tube 23 is disposed loosely inside the filling pipe 3 (filling tube) directly below the filling head 2. In the second exemplary embodiment, the guiding tube 23 is not straight but has a bend 24 so that the guiding tube 23 has a V-shaped configuration.

Figure 4:
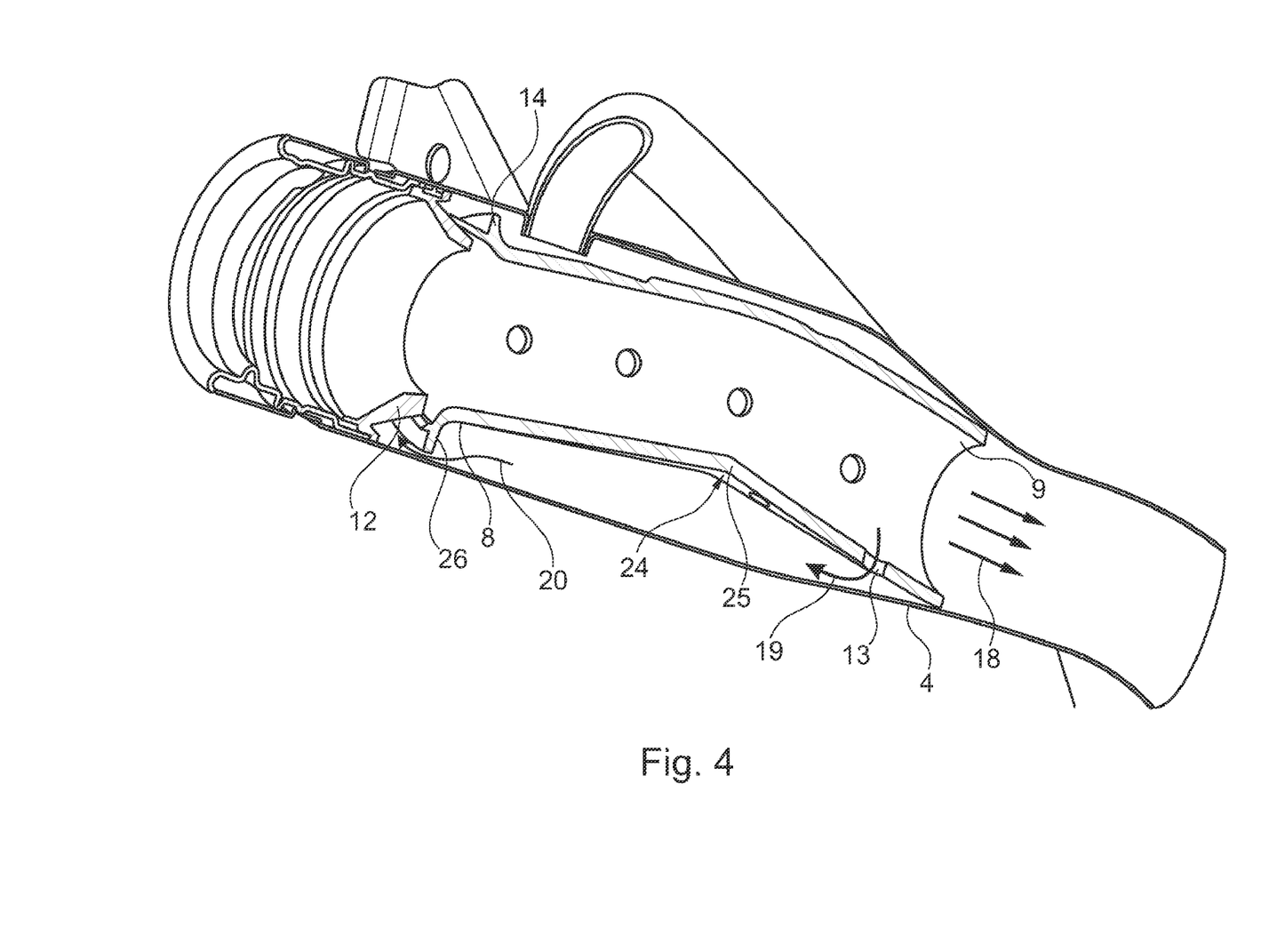
FIG. 4 shows an enlarged view of the guiding tube from FIG. 3.

FIG. 4 shows an enlarged view of the guiding tube 23 from FIG. 3 in partial view. The guiding tube 23 has an approximately V-shaped configuration, and the opening angle of the V-shape is approximately 135°. The tip 25 of the bend 24 is located approximately in the longitudinal centre of the guiding tube 23. The tip 25 is disposed in such a manner that during filling the tip is located below the tip of the filling nozzle not shown in FIG. 4.

As in the first exemplary embodiment, the guiding tube 23 has a plurality of through-openings 13, which extend through the wall thickness of the guiding tube 23 and are distributed over the entire length of the guiding tube 23. The function of these through-openings 13 is as in the first exemplary embodiment.

Figure 5:
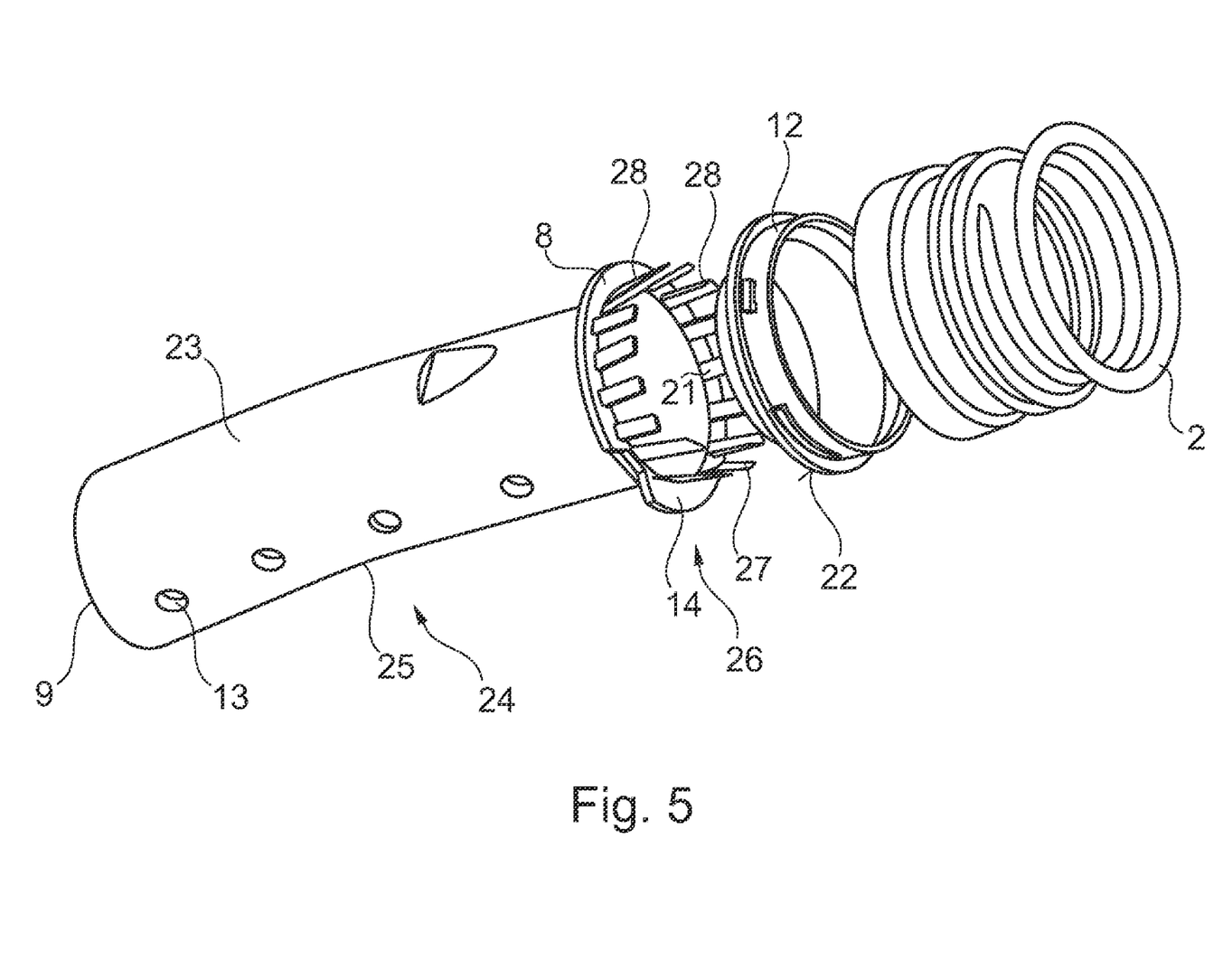
FIG. 5 shows a three-dimensional exploded view of the guiding tube of the second exemplary embodiment.
Figure 6:
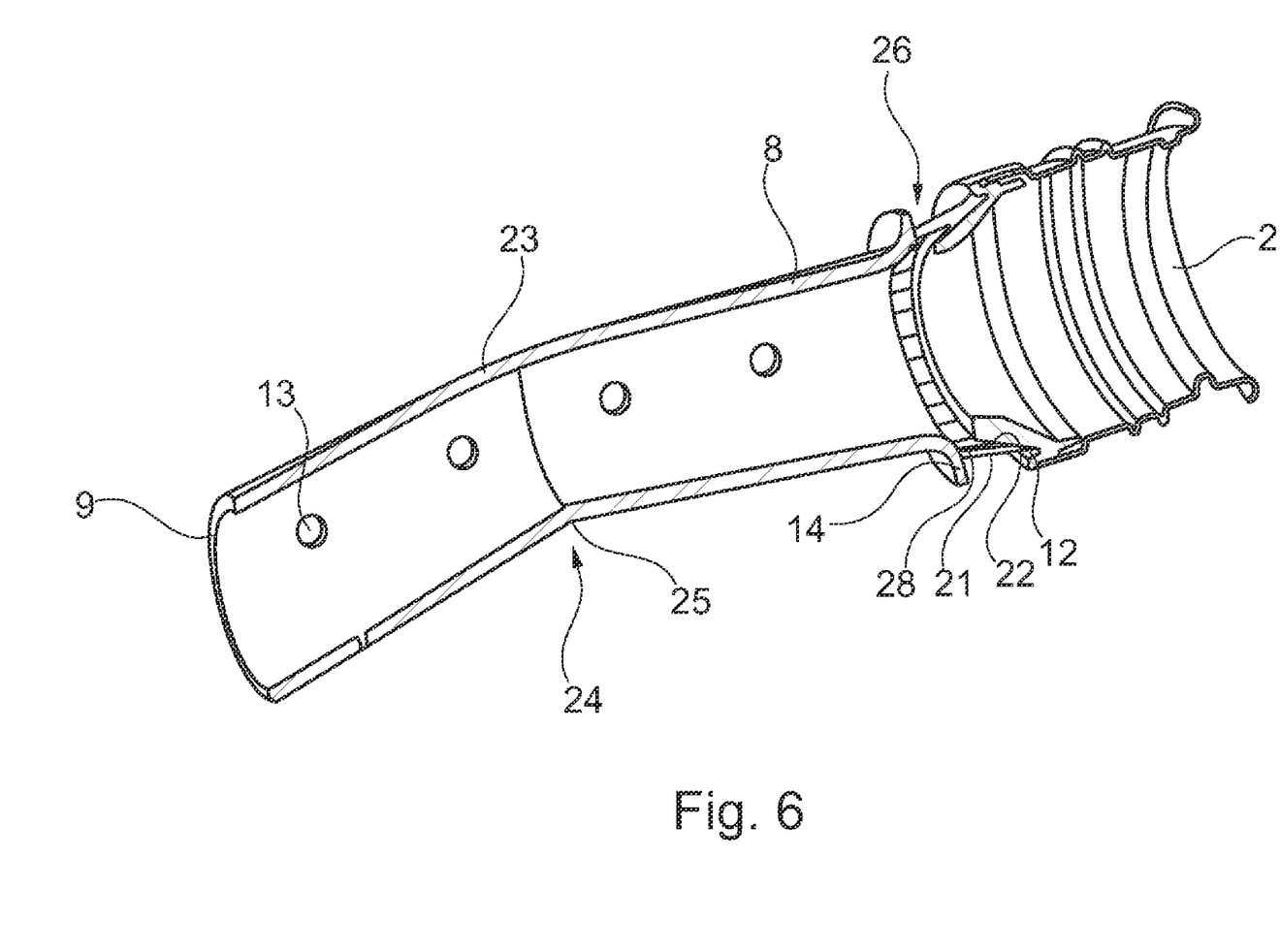
FIG. 6 shows a three-dimensional view of the guiding tube from FIG. 1.

FIG. 5 and FIG. 6 each show a three-dimensional view of the guiding tube 23 of the second exemplary embodiment. The guiding tube 23 further has a length tolerance compensation 26. This exemplary embodiment has a length tolerance compensation 26 in the form of a spring element 27 which is disposed on the front marginal edge 14 of the guiding tube 23.

The spring element 27 has a plurality of strips 28, which are distributed over the marginal edge and project outward from the marginal edge. The strips 28 are flexible and have a shape and size so that the inner surface of the strips covers the outer side of the restriction end of the filling head. With increasing length of the guiding tube 23, an increasing area of the strips 28 covers the restriction end 12 in order to compensate for differences in the length of the guiding tube 23. Consequently, despite a length difference from the optimal length, the guiding tube 23 can be optimally arranged in the filling pipe 3.

The guiding tube 7 according to the first exemplary embodiment furthermore has a length tolerance compensation in an exemplary embodiment not shown. This length tolerance compensation can be a spring element and can comprise a plurality of flexible strips as in the second exemplary embodiment.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fuel filling device, comprising:
   a filling head;
   a filling pipe disposed between a fuel tank and the filling head; and
   a guiding tube disposed inside the filling pipe, the guiding tube having a front end and a rear end viewed in a direction of insertion,
   wherein a marginal edge of the front end is disposed directly below the filling head wherein the front end of the guiding tube has a spring element extending form the marginal edge, which serves as a length tolerance compensation for the guiding tube.

2. The fuel filling device according to claim 1, wherein a marginal edge of the front end of the guiding tube is expanded in such a manner that the guiding tube is held inside the filling pipe with an underside of the filling head.

3. The fuel filling device according to claim 2 wherein the marginal edge of the front end of the guiding tube is expanded in such a manner that during a filling of a vehicle fuel tank, the front end of the guiding tube can accommodate a fuel nozzle tip.

4. The fuel filling device according to claim 1, wherein the guiding tube is disposed between a lower conical region of the filling pipe and an underside of the filling head of the filling pipe.

5. The fuel filling device according to claim 1, wherein the filling head has a restriction end and the spring element is adaptable to an outer side of the restriction end of the filling head.

6. The fuel filling device according to claim 1, wherein the spring element is a flexible expandable marginal edge.

7. The fuel filling device according to claim 1, wherein the spring element has a plurality of individual strips which are each flexible and expandable.

8. The fuel filling device according to claim 4, wherein the rear end of the guiding tube impacts against the lower conical region of the filling pipe and the front end of the guiding tube lies below the filling head.

9. The fuel filling device according to claim 8, wherein when the rear end impacts against the lower conical region, a gap is provided between the front end of the guiding tube and the underside of the filling head.

10. The fuel filling device according to claim 1, wherein the rear end of the guiding tube impacts against a restriction end of the filling head and the spring element extends over an outer side of the restriction end of the filling head.

11. The fuel filling device according to claim 1, wherein the guiding tube is substantially straight.

12. The fuel filling device according to claim 1, wherein the guiding tube is curved.

13. The fuel filling device according to claim 12, wherein the guiding tube comprises a bend having an opening angle of about 130° to about 180°.

14. The fuel filling device according to claim 13, wherein a tip of the bend lies at a point which is located between about 50% and about 30% of a total length of the guiding tube from the rear end of the guiding tube.

15. The fuel filling device according to claim 1, wherein the guiding tube comprises a plurality of through-openings, which extend through a wall thickness of the guiding tube.

16. The fuel filling device according to claim 15, wherein the plurality of through-openings are distributed over the length of the guiding tube.

17. The fuel filling device according to claim 1, wherein the guiding tube is loose inside the filling pipe.

18. The fuel filling device according to claim 17, wherein the guiding tube has an inside diameter, which is dimensioned in such a manner that the guiding tube can accommodate a fuel nozzle tip.

19. The fuel filling device according to claim 18, wherein the inside diameter of the guiding tube is substantially the same over the length of the guiding tube.

20. The fuel filling device according to claim 18, wherein the inside diameter of the guiding tube in a central region of the guiding tube is smaller than at the front end and smaller than at the rear end.

21. A guiding tube comprising:
   a front end viewed in a direction of insertion, wherein the front end of the guiding tube has a spring element, which serves as a length tolerance compensation for the guiding tube;
   a rear end viewed in a direction of insertion and configured to prevent backflow of a fuel during a filling in a fuel filling device, the fuel filling device comprising:
   a filling head; and
   a filling pipe disposed between a fuel tank and the filling head,
   wherein the guiding tube is dimensioned in such a manner that when in use, the guiding tube is configured as a separate part inside the filling pipe,
   wherein a marginal edge of the front end is located directly below the filling head, a marginal edge of the front end of the guiding tube is expanded in such a manner that the guiding tube is retainable inside the filling pipe by an underside of the filling head, and that the guiding tube has an inside diameter which is dimensioned in such a manner that the guiding tube can accommodate a fuel nozzle tip.

22. The guiding tube according to claim 21, wherein the spring element is adaptable to an outer side of a restriction end of the filling head.

23. The guiding tube according to claim 21, wherein the spring element is a flexible expandable marginal edge.

24. The guiding tube according to claim 21, wherein the spring element has a plurality of individual strips which are each flexible and expandable.

25. The guiding tube according to claim 21, wherein the guiding tube is substantially straight.

26. The guiding tube according to claim 21, wherein the guiding tube is curved.

27. The guiding tube according to claim 21, wherein the guiding tube comprises a bend having an opening angle of 130° to 180°.

28. The guiding tube according to claim 21, wherein a tip of the bend lies at a point which is located between about 50% and about 30% of a total length of the guiding tube from the rear end of the guiding tube.

29. The guiding tube according to claim 21, wherein the guiding tube has an inside diameter which is substantially the same over the length of the guiding tube.

30. The guiding tube according to claim 21, wherein the guiding tube has an inside diameter which is smaller in a central region of the guiding tube than at the front end and smaller than at the rear end.

* * * * *